US007711712B2

(12) United States Patent
Kano

(10) Patent No.: US 7,711,712 B2
(45) Date of Patent: May 4, 2010

(54) SYSTEM AND METHOD FOR MANAGING CONSISTENCY AMONG VOLUMES BASED ON APPLICATION INFORMATION

(75) Inventor: Yoshiki Kano, Sunnyvale, CA (US)

(73) Assignee: Hitachi, Ltd., Tokyo (JP)

(*) Notice: Subject to any disclaimer, the term of this patent is extended or adjusted under 35 U.S.C. 154(b) by 379 days.

(21) Appl. No.: 11/685,138

(22) Filed: Mar. 12, 2007

(65) Prior Publication Data
US 2008/0228833 A1 Sep. 18, 2008

(51) Int. Cl.
*G06F 17/30* (2006.01)
(52) U.S. Cl. ................ 707/674; 707/678; 707/672; 707/999.202; 707/999.204
(58) Field of Classification Search ............. 707/1–10
See application file for complete search history.

(56) References Cited

U.S. PATENT DOCUMENTS

| 5,333,314 | A | * | 7/1994 | Masai et al. ........... 707/202 |
|---|---|---|---|---|
| 6,065,018 | A | * | 5/2000 | Beier et al. ........... 707/202 |
| 6,578,041 | B1 | * | 6/2003 | Lomet ................ 707/102 |
| 7,406,489 | B2 | * | 7/2008 | Soini et al. ........... 707/204 |
| 7,409,414 | B2 | * | 8/2008 | Okada et al. .......... 707/204 |
| 2004/0268067 | A1 | * | 12/2004 | Yamagami ............ 711/159 |
| 2006/0047720 | A1 | * | 3/2006 | Kulkarni et al. ........ 707/204 |
| 2006/0242211 | A1 | * | 10/2006 | Becker et al. .......... 707/204 |
| 2007/0143365 | A1 | * | 6/2007 | D'Souza et al. ........ 707/203 |

FOREIGN PATENT DOCUMENTS

EP 1246050 A2 10/2002

OTHER PUBLICATIONS

Texas Education Code—Section 61.313.—Use of Protected Term in Name of Institution, oncle Court Opinion. online, Aug. 10, 2007.*
Revivio CPS http://www.revivio.com/.
XOSoft's Enterprise Rewinder; User Guide. 2007 http://www.xosoft.com/documentation/Enterprise_Rewinder_User_Guide.pdf.
V$trasaction; Oracle http://download-east.oracle.com/docs/cd/B19306_01/server.102/b14237/dynviews_2170.htm.
U.S. Appl. No. 11/404,190, filed Apr. 14, 2006, Kano, et al.
U.S. Appl. No. 11/471,105, filed Jun. 19, 2006, Kano, et al.

* cited by examiner

*Primary Examiner*—Mohammad Ali
*Assistant Examiner*—Sheryl Holland
(74) *Attorney, Agent, or Firm*—Sughrue Mion, PLLC; Alan J. Kasper

(57) ABSTRACT

In accordance with new technique, a computerized data recovery system includes a storage subsystem and a backup server operatively coupled to backup storage medium, the storage subsystem including a continuous data protection system. The backup server executes a recovery manager which: collects consistency points from at least two database applications executing on at least one host; collects journal terms of the continuous data protection system for each of the at least two database applications; collects log terms associated with each of the at least two database applications; displays to a user a timeline for a protected term and consistency points for the at least two database applications; receives recovery time selection from a user; receives recovery database application selection from the user; receives baseline database application selection from the user; performs crash recovery for each database application; and performs recovery of data based on transactions associated with the at least two database applications.

23 Claims, 18 Drawing Sheets

Source: DB1 (125)

120

| Communicated Host (121) | Application name(122) | Last updated Transaction ID(123) | SCN (124) | Completion Recovery(125) |
|---|---|---|---|---|
| 192.168.0.2 | DB2 | 0003000800000501 | 10203 | Yes |
| 192.168.0.3 | DB3 | 0001000200000101 | 29391 | No |
| ... | ... | ... | ... | ... |

Source: DB2

130

| Communicated Host | Application name | Last updated Transaction ID | SCN | Completion Recovery |
|---|---|---|---|---|
| 192.168.0.1 | DB1 | 0000000100000203 | 34 | Yes |
| 192.168.0.3 | DB3 | 0001000200000071 | 29381 | No |
| ... | ... | ... | ... | ... |

Figure 5

| ID (151) | Date (152) | Time (153) | application (154) | Method of keeping consistency point (155) | Device (156) | Media (Tape ID/ LDEV/ Marker) (157) |
|---|---|---|---|---|---|---|
| 0203212 | 10/03/06 | 00:00 | DBm | Tape | 1021 | 1021 |
| ... | ... | ... | ... | ... | ... | ... |
| 0202001 | 10/03/06 | 00:00 | DBm | PIT Mirror | 501212 | 101 |
| 0202002 | 10/03/06 | 08:00 | DB1 | CDP Marker | 501212 | 32 |
| 0202003 | 10/03/06 | 08:02 | DB2 | CDP Marker | 501212 | 33 |
| ... | ... | ... | ... | ... | ... | ... |

Figure 7

| DB Name (161) | Archive Log | | CDP JNL | |
|---|---|---|---|---|
| | Start (162) | End (163) | Start (164) | End (165) |
| DB1 | 10/02/'06 14:00 | 10/03/'06 10:00 | 10/02/'06 13:10 | 10/03/'06 10:00 |
| DB2 | 05/20/'06 12:00 | 10/03/'06 10:00 | 05/20/'06 13:03 | 10/03/'06 10:00 |
| ... | ... | ... | ... | ... |
| DBm | 02/20/'06 14:00 | 10/03/'06 10:00 | - | - |

| Host (226) | Application (227) | Device name (228) | Port (229) | LU (300) |
|---|---|---|---|---|
| 192.168.0.1 | DB1 | /dev/sd0a | 1 | 1 |
| | | /dev/sd1a | 1 | 2 |
| 192.168.0.2 | DB2 | /dev/sd0a | 1 | 1 |
| ... | ... | ... | ... | ... |

Figure 15

SYSTEM AND METHOD FOR MANAGING CONSISTENCY AMONG VOLUMES BASED ON APPLICATION INFORMATION

DESCRIPTION OF THE INVENTION

1. Field of the Invention

This invention generally relates to data storage systems and, more specifically, to data storage systems using Continues Data Protection (CDP) technology.

2. Description of the Related Art

Continuous Data Protection (CDP) technology protects user data anytime by journaling every write input/output (IO) operation from an application. The journaled IO data is stored in storage, which is independent from the primary storage associated with the host computer system executing the subject application. The modern CDP can record various application events such as checkpoints associated with a database (DB) application, as well as the timing of the execution of the file closing operations.

Basic CDP technology is described in U.S. Patent Application No. US20040268067 A1, "Method and apparatus for backup and recovery system using storage based journaling," which is incorporated herein by reference. The described CDP methodology provides copy on write journaling capabilities and keeps unique sequence number for journal and snapshot.

There are also several available commercial CDP products. One exemplary enterprise product is REVIVO CPS 1200i, This product operates to mirror I/O operations on host, and provides an appliance for receiving mirrored I/O operations and storing those operations as journal. The system also indexes the stored information for subsequent restore.

Another CDP's product is able to automatically determine the behavior of the protected application. This product is XOSoft's Enterprise Rewinder. This product can automatically determine behavior of various applications, such as Microsoft® Exchange®, including application's checkpoints.

U.S. patent application Ser. No. 11/404,190 described system and method for processing a plurality types of event markers of a continuous data protection system. Also, U.S. patent application Ser. No. 11/471,105 describes system and method for managing a consistency among multiple volumes in a continuous data protection system. The disclosure of these patent applications is incorporated by reference herein in their entirety.

On the other hand, there are numerous database (DB) applications, which also require data protection. The modern CDP systems can provide data protection for solo DB applications using crash recovery. However, currently there is no technology permitting recovery of multiple DB applications using CDP crash recovery mechanism, which is capable of performing roll forward type recovery for transactions distributed among several database applications.

Thus, what is needed is a technology for creating a federated application environment protected by both of CDP and other data protection methods.

SUMMARY OF THE INVENTION

The inventive methodology is directed to methods and systems that substantially obviate one or more of the above and other problems associated with conventional techniques for continuous data protection.

In accordance with one aspect of the inventive methodology, there is provided a method for data recovery. The inventive method involves collecting consistency points from at least two database applications; collecting journal terms associated with continuous data protection for each of the at least two database applications; collecting log terms associated with each of the at least two database applications; displaying to a user a timeline for a protected term and consistency points for the at least two database applications; receiving recovery time selection from a user; receiving recovery database application selection from the user; receiving baseline database application selection from the user; performing crash recovery for each database application; and performing recovery of data based on transactions associated with the at least two database applications.

In accordance with another aspect of the inventive methodology, there is provided a computerized data recovery system. The inventive system includes a storage subsystem and a backup server operatively coupled to backup storage medium. The storage subsystem includes a continuous data protection system, while the backup server executes a recovery manager operable to: collect consistency points from at least two database applications executing on at least one host; collect journal terms of the continuous data protection system for each of the at least two database applications; collect log terms associated with each of the at least two database applications; display to a user a timeline for a protected term and consistency points for the at least two database applications; receive recovery time selection from a user; receive recovery database application selection from the user; receive baseline database application selection from the user; perform crash recovery for each database application; and perform recovery of data based on transactions associated with the at least two database applications.

In accordance with yet another aspect of the inventive methodology, there is provided a computer-readable medium embodying a set of computer instructions, the instructions, when executed by one or more processors causing the one or more processors to: collect consistency points from at least two database applications; collect journal terms associated with continuous data protection for each of the at least two database applications; collect log terms associated with each of the at least two database applications; display to a user a timeline for a protected term and consistency points for the at least two database applications; receive recovery time selection from a user; receive recovery database application selection from the user; receive baseline database application selection from the user; perform crash recovery for a database application; and perform recovery of data based on transactions associated with the at least two database applications.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 5 illustrates an exemplary table associated with a source database;

FIG. 7 illustrates exemplary media manager consistent points;

FIG. 15 illustrates an exemplary embodiment of a mapping information;

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Three exemplary embodiments of the inventive concept will be described in detail hereinbelow. These three embodiments differ from each other in the aspects of the configuration of the respective implementations. However, the general concept of the present invention remains the same and it is implemented in all the described embodiments. Specifically, all three described embodiments are capable of keeping data consistency among several databases.

Embodiment 1

Recovery Under CDP's Single Consistency Group and Other Point in Time Backup Data The first exemplary embodiment described herein uses a CDP's single consistency group for DB application and other point-in-time data such as mirror copies, snapshots, and tapes.

1. Physical Configuration

Figure 1:
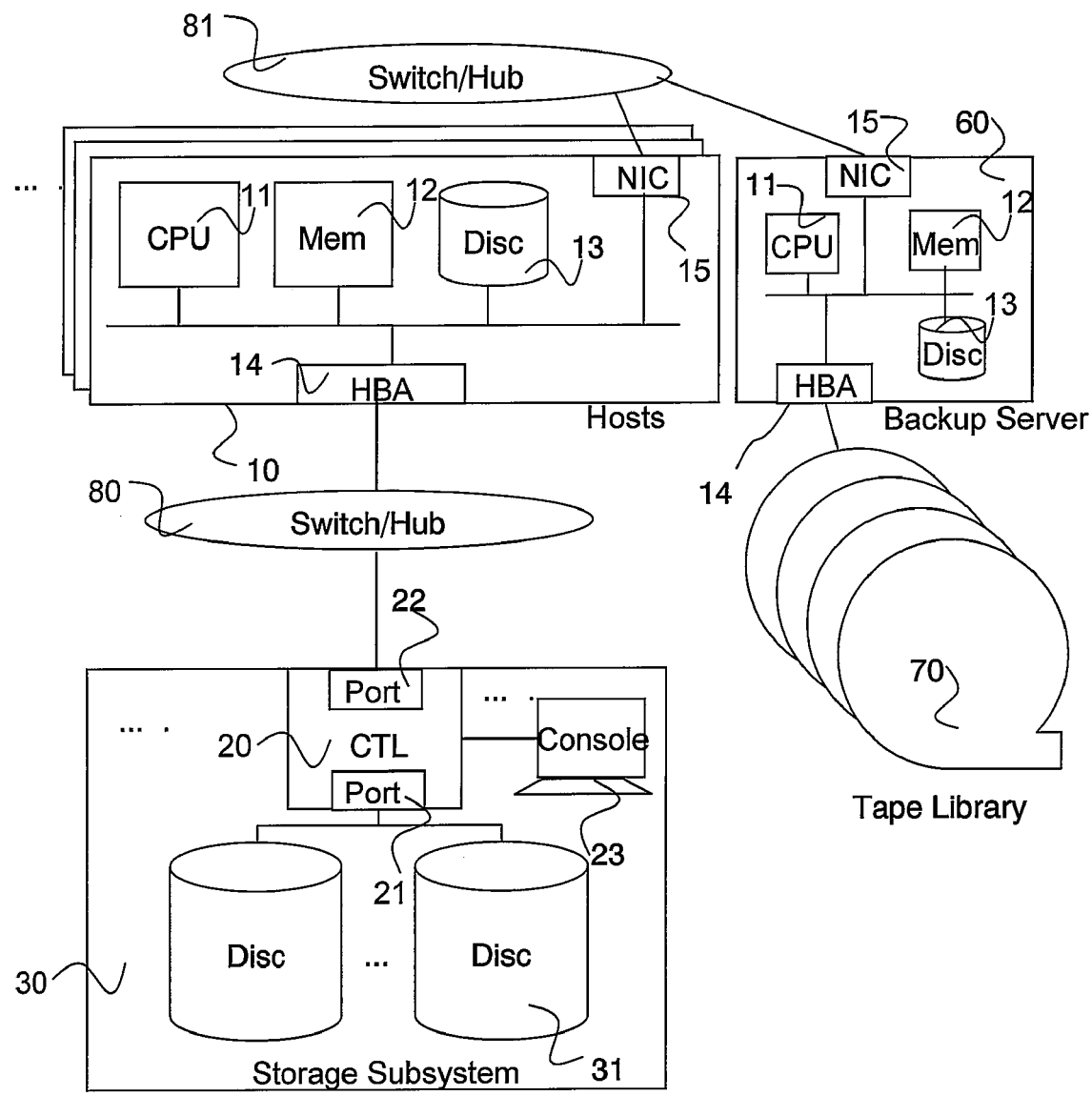
FIG. 1 shows an exemplary diagram illustrating the hardware components and interconnections among components.

FIG. 1 shows a diagram illustrating various hardware components of the system in accordance with the first exemplary embodiment and interconnections among those hardware components.

The aforesaid system includes at least a host operatively coupled to several storage subsystems. Each component will be described in detail below:

Specifically, Host 10 and Backup Server 60 incorporate Operating System running on specialized or generic hardware, such as standard workstation or personal computer.

The host 10 incorporates CPU 11, memory (mem) 12, internal disc 13 and NIC 15 (Network interface card).

The host 10 includes Host Bus Adapter (HBA) 14 provided for connecting the host 10 to a generic FC (Fibre Channel) switch, a generic Ethernet switch 80 or a directly attached storage subsystem.

The backup server also includes Host Bus Adapter (HBA) 14 to enable connection to a generic FC switch, a generic Ethernet switch 80 or a directly attached tape library 70.

Each host stores the associated data on a Logical Unit (LU) provided by the storage subsystem.

Storage Subsystem 30 has the features and capabilities described below:

Specifically, the storage subsystem has capabilities to store data using SCSI-2 or SCSI-3 command sets within the associated LUs. In addition, the storage subsystem may incorporate several RAID controllers (CTL) 20 and several Discs 31.

The RAID controller 20 includes one or more processors, memory, NIC such as Ethernet and an FC port, which is accessible from SAN or to Discs to process SCSI I/O operations and consists of RAID configuration using several Discs residing in the storage subsystem (Not depicted in figures).

The controller preferably includes non-volatile random access memory (NVRAM) and is capable of storing data to the aforesaid NVRAM, utilizing it as a cache memory having a protection from a power failure.

The controller additionally provides ports capable of being identified by WWN (World Wide Name), which specifies the target ID as SCSI world from the host, and which consists of a logical unit number (LUN) on a Fibre Channel (FC) port.

The storage subsystem may include an internal management console 23, which is connected to the storage subsystem internally and is accessible from any generic console, such as a generic web-based PC or a workstation provided for managing the storage subsystem. The console (not depicted in FIG. 1) of the storage administrator may be located externally and can be accessible via a generic IP protocol enabled network switch, such Ethernet hub, switch and/or IP router.

A Tape Library 70 is equipped with SCSI-3 media changer command set or equivalent protocol/API to change media and may include several Tape drives for accessing data on tapes. The tapes could be loaded into the Tape Library 70 using one of several slots provided therein.

2. Logical Configuration

Figure 2:
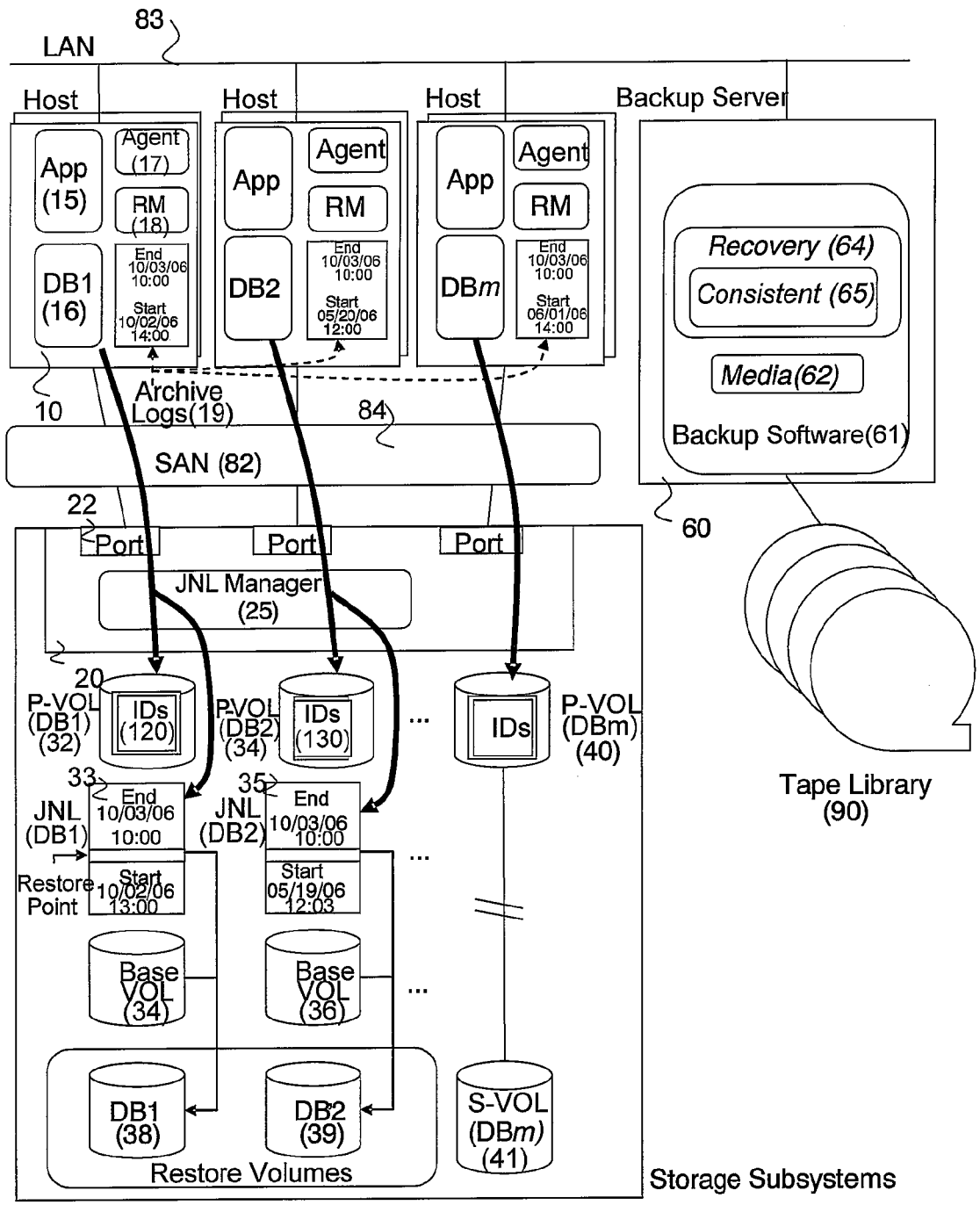
FIG. 2 illustrates an exemplary logical configuration of one embodiment including software components and illustrating their interoperation.

FIG. 2 illustrates logical configuration of the system of the first embodiment, including various software components and their interoperation. Each shown component will be discussed in detail below.

LAN 83: LAN (Local Area Network) provides communicating among hosts and backup server. The communication will use TCP/IP protocol. LAN consists of Ethernet switch/Hub, FDDI, Token-ring, ATM or other kind of IP transferable network.

SAN 82: SAN (Storage Area Network) provides block access capable logical network connection, such as SCSI, FC-SCSI (Fibre Channel SCSI), ESCON or other. In describing this embodiment, for purposes of simplifying the description, FC-SCSI will mainly be used. The SAN provides a logical connection between the Host and the Storage Subsystem via a port. This connectivity is provided mainly by the fibre channel (FC) switch or hub, or, alternatively, by Ethernet Switch or hub or the like.

Host 10: Host 10 incorporates OS (Not depicted), database (DB) 16, DB application 15, SCSI driver (Not depicted), Raid Manager (RM) 18 and backup agent (Agent) 17. The OS may be UNIX, Microsoft Windows, Solaris, Z/OS, AIX, Linux or any other kind of known or later developed operating system.

The application may be a transaction type application, which uses the DB. DB may include an online log as well as datafiles for tablespaces stored on storage subsystem. Archive log may be stored on the host or within another storage subsystem.

To control the mirror or CDP operation, the host 20 may incorporate raid manager (RM), provided as an in-band control mechanism. The RM communicates with the storage subsystem. With respect to the communication method with the storage subsystem, an embodiment of the inventive system utilizes a technology, which controls the storage device using SCSI command sets. The aforesaid technology for controlling the storage subsystem 30 using SCSI commands is described in detail in European patent application No. EP1246050, which is incorporated herein by reference in its entirety. It should be noted that the agent 19 of the embodiment of the inventive system shown in FIG. 2 (RM) is generally equivalent to the RMLIB, while the command device 27 (CMD DEV) is generally equivalent to the CM described in the EP1246050.

Figure 3:
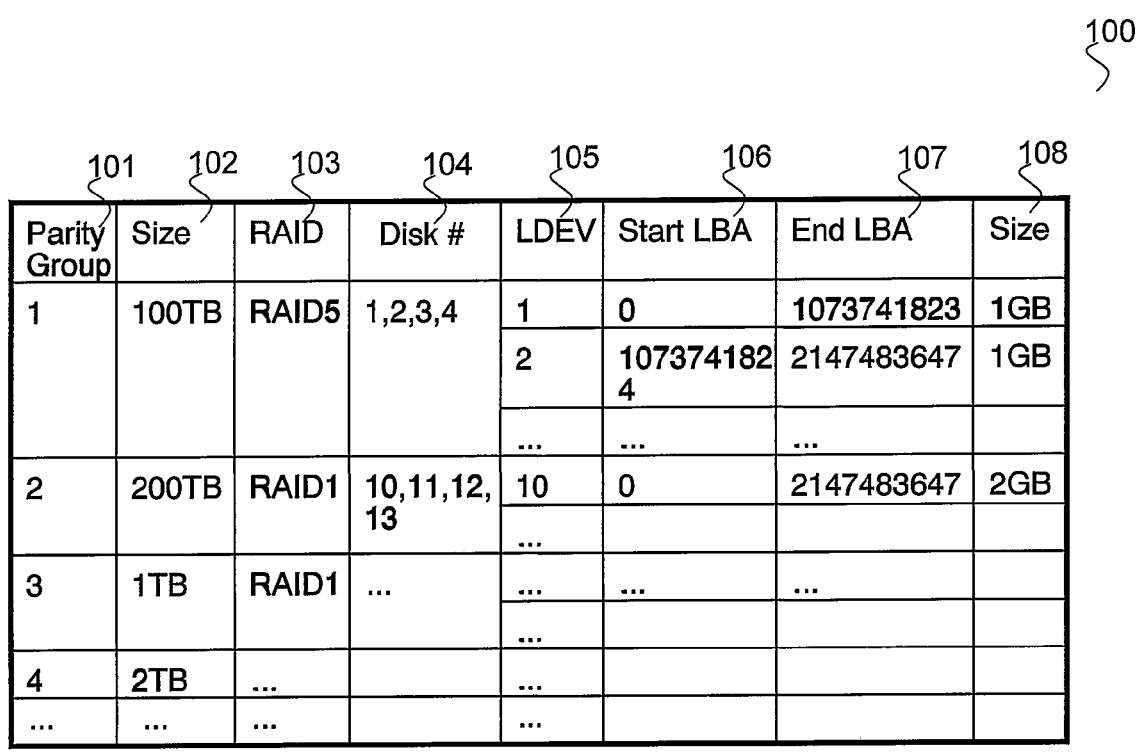
FIG. 3 illustrates an exemplary volume configuration structure 100.

An exemplary implementation of command line interface (CLI) operable to control CDP disposed within a storage system is illustrated in FIG. 3 of the aforesaid U.S. patent application Ser. No. 11/404,190, incorporated by reference herein.

Backup agent 17 is operable to extract backup data/restore data to/from the backup server providing for data consistency in the DB application which stores the associated data in DB and may also store it in the filessystem.

Storage subsystem: In one embodiment, the modules of storage subsystem are enabled in microcode which is executed on the controller (CTL) and is provided as a program code installing form optical media, FD, and other removal devices. The microcode consists of parity group manager, volume manager (VOL Manager) that creates a volume to provide a volume to host and journal manager, which will be discussed hereinbelow. Each of the aforesaid microcode modules will be described in detail below.

Parity group manager (not depicted in FIG. 2): This module is a part of microcode and may consist of a parity group including discs utilizing RAID0/1/2/3/4/5/6 technology. RAID 6 is based on the RAID 5 technology, well known to persons of skill in the art, but including a dual parity protection. The created parity group is listed in VOL Config structure 100, shown in FIG. 3, and is provided with parity group number 101 to identify the parity group within the storage subsystem, usable capacity size 102 created from the RAID technology, RAID configuration 103, and the utilized Discs 104 which are identify from discs 31.

Volume Manager (Vol Manager) (not depicted in FIG. 2): The Volume Manager manages volume's structure and the behavior with respect to I/O operations directed to the LUs. The volume is a portion of a parity group which exports toward LU to read and write data issued by the host. Administrator defines and initially formats the region of the volume added the volume number by volume manager. The mapping between the volume and the parity group is stored in the VOL Config 100, shown in FIG. 3. On a parity group number 101, a record in VOL Config has volume number 105 to identify the logical device (LDEV, a.k.a volume) within the storage subsystem, start Logical Block Address (LBA) 106 representing volume's start address on the parity group, end LBA 107 presenting volume, address on the parity group, and size 108 to present the size of VOL.

Figure 4:
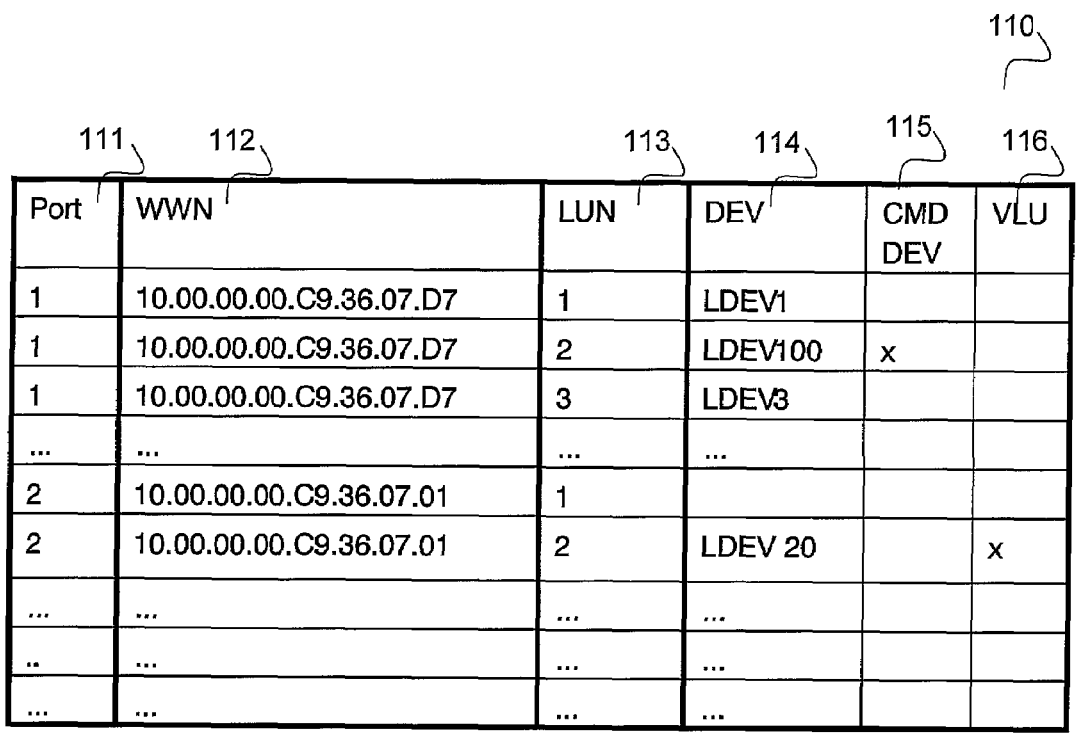
FIG. 4 illustrates exemplary mapping table between a logical unit (LU) and a volume (a.k.a. LDEV)

Port 22 (a.k.a 111): Ports enable the associated volumes to be accessed from SAN via logical unit (LU) on a WWN. FIG. 4 shows an exemplary mapping table between an LU and a volume. Each value in the hardware port 111 column of the table shown in FIG. 4 corresponds to one of the ports shown in FIG. 1 or FIG. 2. Each port has its own WWN 112, which is specified from host to access LUs via port. A plurality of different LUs can be assigned to the port. An LU is specified by a pair of WWN in column 112 and LUN in column 113. Based on the FC-SCSI protocol specifications, the maximum number of logical units that can be associated with a port is 256. Further, each LU is mapped to a volume, which is used to store data from the hosts 10. Based on this mapping information, the controller 20 receives SCSI commands from the port and converts the set of WWN of column 112 and LUN of column 113 into the volume identified of column 114 to access the appropriate volumes. Also stored in the table shown in FIG. 4 is a command device (CMD DEV) entry 115 used to control the storage subsystem from host's RM (Raid Manager) 18.

With respect to each LU, storage system administrator can configure LU as a Virtual LU to make the LU visible to the host even if the LU does not have the corresponding LDEV or the restore image. When the administrator designates LU as a Virtual LU, the storage subsystem turns on the VLU bit in column 116. In this mode, storage subsystem always makes the LU available to host regardless of assignment of LDEV to the LU.

Mirror Manager (not depicted in FIG. 2): The Mirror Manager controls mirror operations based on the RM commands. The mirror operations include "create pair" operation between P-VOL and S-VOL, as well as "resync", "split", "reverse resync", and "delete pair" operations. After the execution of the split after resync operation, a point-in-time (PIT) image volumes can be created using mirror or snapshot technology.

JNL Manager 25: The JNL Manager obtains I/O journal stored on the JNL volumes 33 and 35 for P-VOL and stores marker information on the JNL, thereby creating a server specified point in time. The JNL Manager also creates an I/O consistency group and creates I/O serialization among volumes. During the restore operation, volumes 38 and 39 are restored, which store a copy of the base volumes 34, 36 by applying journal data up to time or up to marker. After the restore, each restore volume is attached to the LU of the P-VOL instead of the P-VOL. In an embodiment of the invention, the restore volume may be attached on another LU, which is exported to another host. In this configuration, a user needs to configure the host 10 in a similar manner in order to check data on restored volumes. The behavior of the Journal Manager 25 is the same as the operation of the JNL manager 24, described in the aforesaid U.S. patent application Ser. No. 11/404,190.

Backup Server 60: The Backup Server 60 incorporates of an OS (not depicted in FIG. 2), Backup Software (61), HBA driver (not depicted in FIG. 2). The Backup Software includes Media Manager (Media) 62 provided for managing the existing consistent backup data, and Recovery Manager (64) for restoring and recovering a set of DB. The Consistent 65 (also referred to as consistency manager) module of the Recovery Manager 64 makes an alignment of transactions among several DB applications. Media Manager 62 manages the consistent backup data, which are in a form of point-in-time images created by mirror's resync and split operation after the pair or snapshots, Tape or CDP's marker after creating application consistency point using application's hot and cold backup, as well as date and time. The Backup Software 61 is operable to communicate with the backup agent 17 to make a consistent state for application data, and to perform backup of the data via the LAN, and restore of the data via the LAN. The backup agent may work with Microsoft's Volume Shadow Copy Service (VSS) to make a consistent state for application data as one of examples.

3. Operations

On the backup server, user executes recovery operation for a set of DB applications. Before the details of the operation will be discussed, an initial setup and transaction operations for DB and DB application as dependent environment will be described.

3.1 Initial Setup

First, storage administrator creates LU for selected DB applications. The created LUs are configured to be protected by the CDP on storage subsystem. Host administrator then executes procedure to discover the created LUs and then creates the corresponding device files in the operating system environment. After that, the DB administrator creates DB data, log and related data sets on the created LUs. DB administrator may also create DB table data as data files on filesystem after the host administrator creates a filesystem on the LUs. DB application administrator runs the DB application on the DB using JDBC, ODBC or other types of DB access method.

3.2 Transactions in DB Application

To find the last transaction for other DB applications, a DB application leaves a record of the last transaction for other communicated DB's application after their transaction, which is communicated with other DB's application.

After commit of transaction, target DB's application gets a current active transaction ID like XID in Oracle-type database and System Change Number (SCN) for the transaction using V$TRANSACTION information in Oracle-type Database and store the information on source DB's table as last transaction for the DB application. Other DB vendors have similar information for the active transactions.

FIG. 5 illustrates an exemplary embodiment of a table 120 in DB1, which acts as a source DB. The shown table includes a communicated Host IP address 121 from source Host (125), application name 122, Last updated Transaction ID (123), System change number (SCN) (124) and Completion Recovery (126) to indicate processed recovery operation using "Yes" as finish or "No" as unprocessed. Other databases, including DB2, also include tables 130 that are similar to the table 120 of DB1.

3.3. GUI for Recovery

When a failure occurs, which affects several DBs, it is necessary to restore and recover the DB data. Recovery manager provides a GUI for this purpose. During the recovery operation, the recovery manager creates a GUI for recovering a set of data among several DB applications. The corresponding procedure is described below and illustrated in FIG. 6.

The procedure starts with step 141.

Step 141: Recovery manager collects consistency points of several DB applications. The collected consistency points may include Mirrored or snapshot Point-In-Time image, as well as tape and CDP's markers from the media manager 62.

The consistency point of DB applications includes backup data which may be created using either hot backup or cold backup procedure after the backup software coordinated with application via the backup agent.

As an example of media manager's consistent points, there is a table 150 in FIG. 7. The table consists of backup ID 151 serialized by backup software, data 152, time 153 taken backup, application name 154 taken backup, Method of keeping consistent point 155 which are tape, PIT Mirror, PIT snapshot, CDP marker, and etc, Device number or identifier of device 156 like serial number of device, Media number 157 which is tape ID, LDEV number on storage subsystem, or marker number.

Step 142: Recovery manager collects terms of CDP's journal terms for each CDP protected application accessing journal's first and end header information via RM or out-band I/F via LAN.

Figure 8:
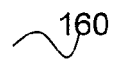
FIG. 8 illustrates exemplary media manager terms.

As an example of media manager's terms of those, there is a table 160 in FIG. 8. The table consists of DB's application name 161, start 164 and end 165 data & time in CDP journal.

Step 143: Recovery manager collects terms of DB's logs (a.k.a. redo log and archive log) for each DB's application accessing DB's SQL I/F.

As an example of media manager's terms of those, there is a table 160 in FIG. 8. The table consists of DB's application name 161, start 162 and end 163 data & time in archive log.

Step 144: Recovery manager shows timeline for protected term and consistency points on all of application (Discuss in section 3.3.1).

Step 145: User selects a recovery time considering "consistency point based recovery" or "time based recovery" as restore, and then user selects target DB's applications to restore data and specifies baseline DB's application for this recovery (Discuss in section 3.3.1).

Step 146: Recovery manager initiates CDP to restore data for requested time. If the restore is consistency point based, then recovery manager restores last consistency point data before the selected recovery time for CDP protected volumes. If the restore is time based, then recovery manager restores data based on the specified time.

Step 147: Consistency Manager in Recovery manager initiates to execute recovery data considering transaction among DB's applications. Whereupon, the procedure terminates.

3.3.1 GUI

Figure 9:
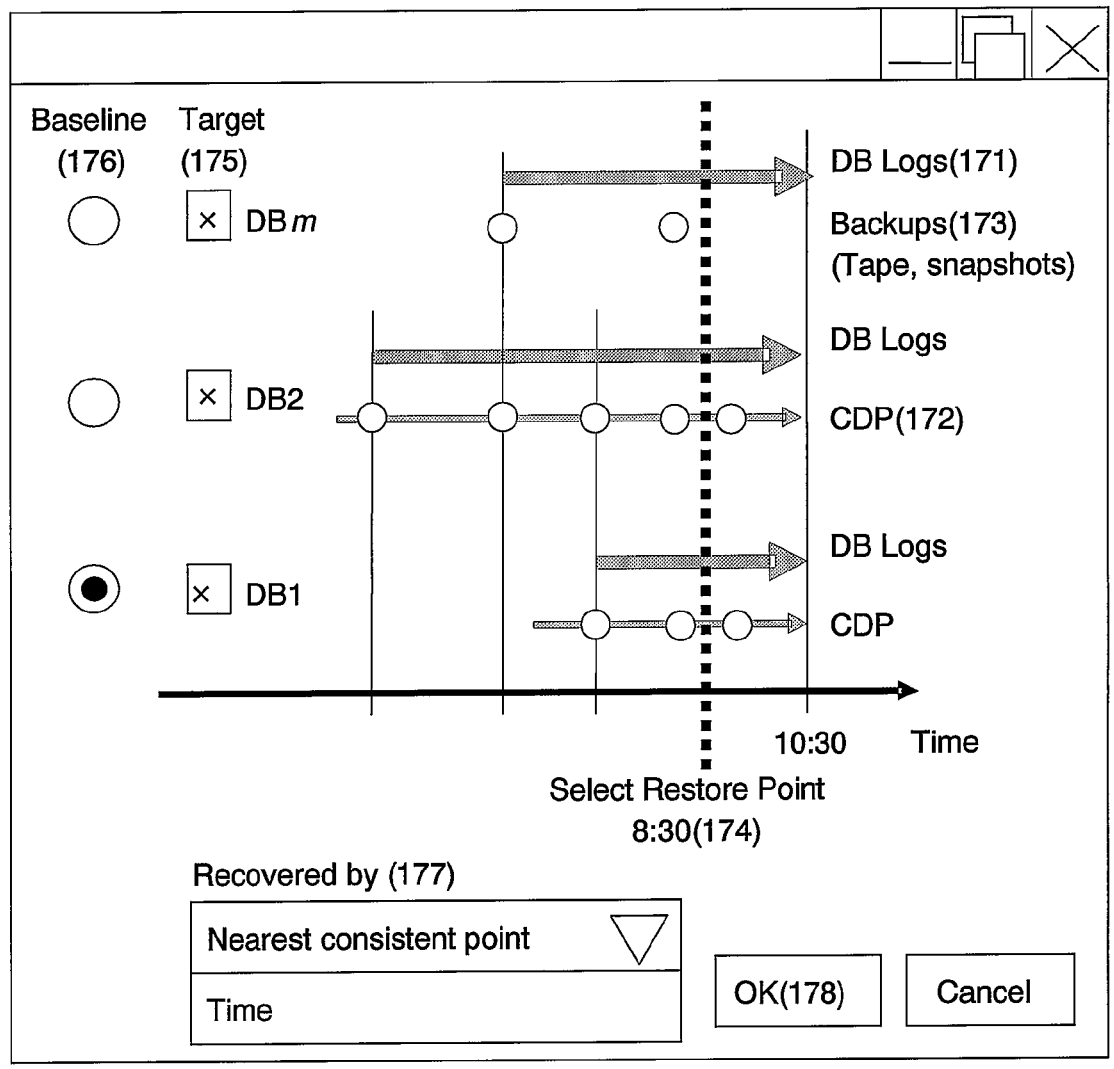
FIG. 9 illustrates an exemplary embodiment of a graphical user interface (GUI).

At Step 144, recovery manager creates recovery GUI. An exemplary embodiment of the GUI 170 is shown in FIG. 9.

GUI 170 consists of terms of DB's Logs (which is online log and archive log) and CDP and consistent point indicated by small circle for each DB application on each timeline. User selects target recovery DB's applications using check box 175, selects a baseline application using option button (176)

and then select restore time using dash bar (174). The dash bar which indicates user wanted restore point among multiple DB's applications can slide only between time of earliest DB's log or CDP journal and one of latest DB's log or CDP journal.

As a recovery option, a user may choose a DB mountable restore method for data which are time based restore or nearest consistent point (177) for each of the DB's application volumes.

Figure 6:
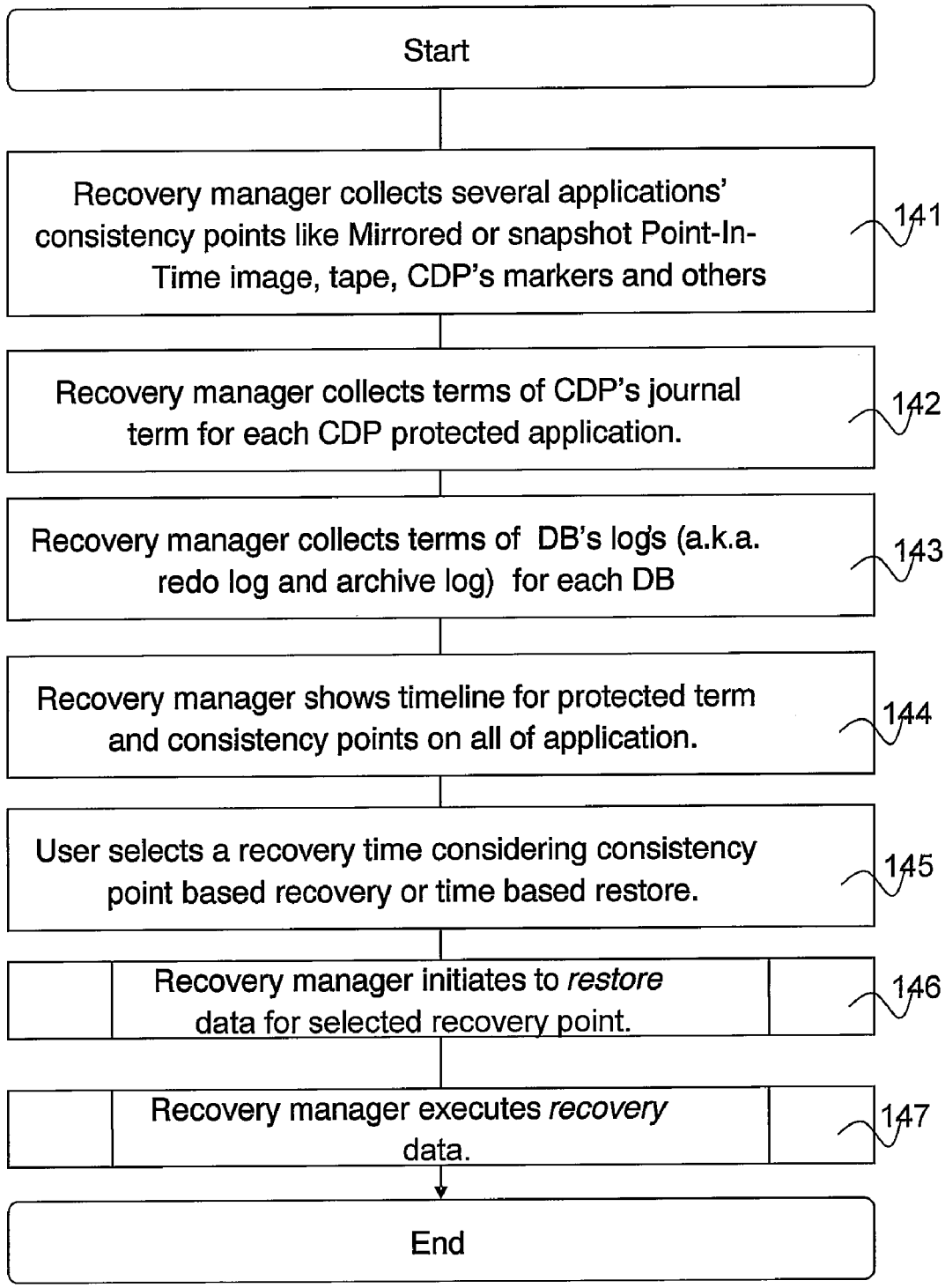
FIG. 6 illustrates an exemplary procedure for creating a GUI for recovery of a set of data.
Figure 10:
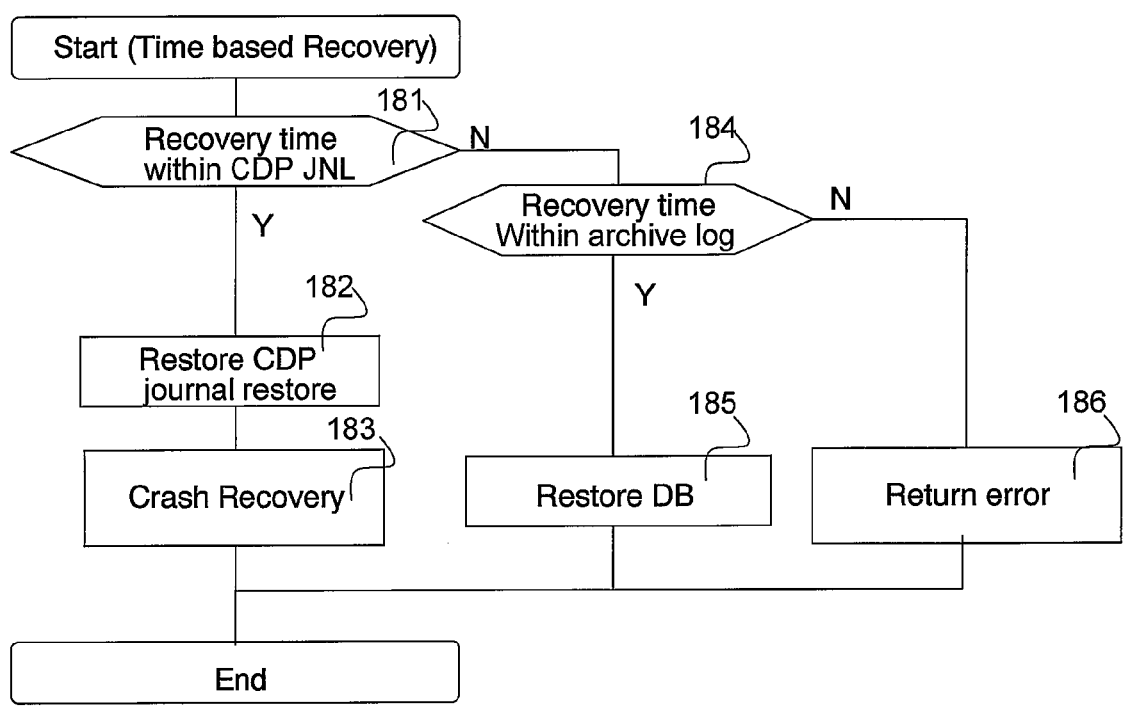
FIG. 10 illustrates an exemplary time based restore operation.

In case of time based restore (FIG. 10), recovery manager 64 initiates CDP to restore data by time; Recovery manager restores data by time using CDP (182) and executes crash recovery for DB (183) and if LU is protected by CDP and the recovery time is between the times of the first and the last entries on CDP's JNL (181). If there are several applications under a consistency group, recovery manager initiates CDP to restore a set of volumes at a time using restore a set of volumes under the consistency group by time. To find a mapping between application and volume, recovery manager discoveries the mapping information via backup agent and RM. The mapping information 200 (FIG. 15) consists of host address 226, application name 227, device files within OS 228, port 229 on storage subsystem and LU (230). And to find whether the application on a consistency group or not, storage subsystem provides consistency group information referring table, which is illustrated in FIG. 6 of the aforesaid U.S. patent application Ser. No. 11/404,190, incorporated by reference herein. This table can be used to find out which LUs are on a consistency group. Recovery manager retrieves this information from storage subsystem and uses this information.

Figure 18:
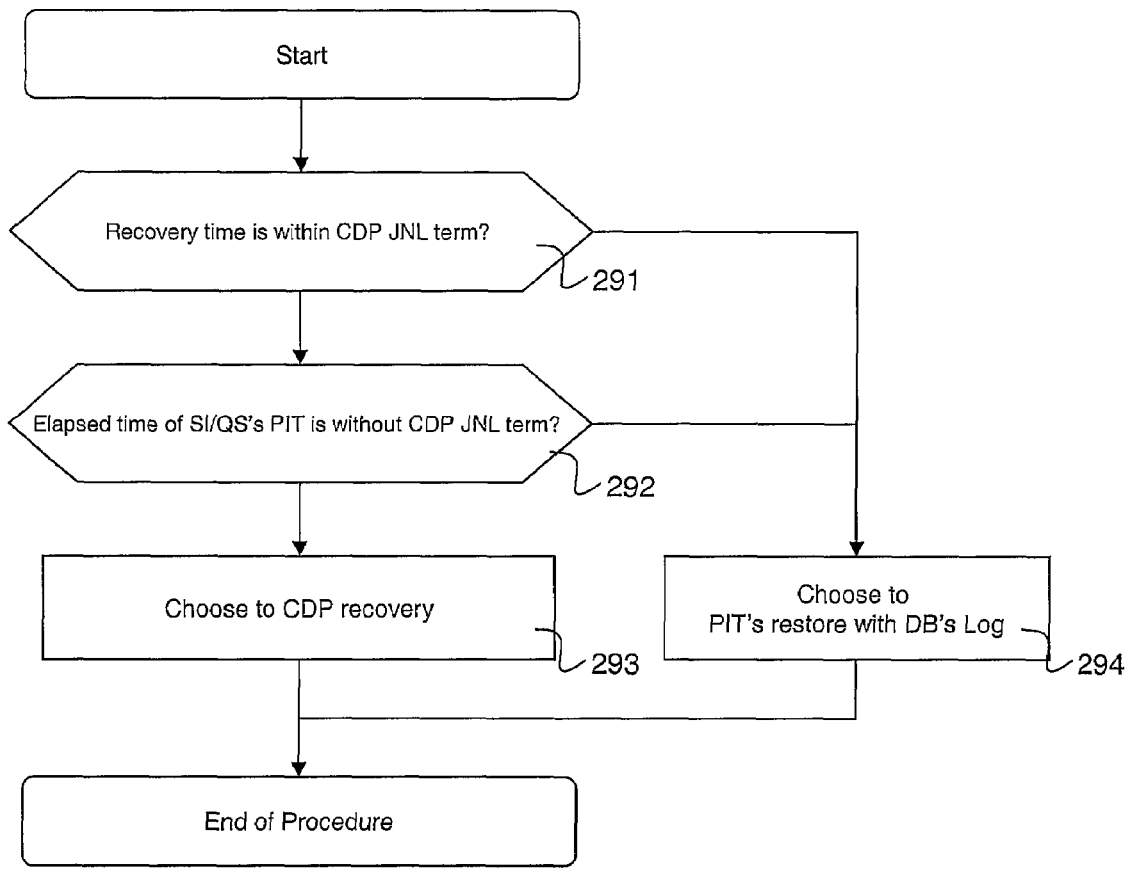
FIG. 18 illustrates an exemplary embodiment of a recovery method selection process.

The recovery manager initiates the restore data operation (185), which has a consistent image using each restore method like CDP's marker restore and SI/QS's reverse restore and other. The volumes for a DB may be protected by several types of copy technology, such as CDP with SI, QS, or using any other disk base backup method. In that case, we may choose a faster DB's recovery method. For example, we assume that applying time of DB's log and JNL's log is same and that copy rate from CDP's baseline volume to primary volume and one from SI, QS or other are same. The difference is differential copy of CDP from baseline to primary volume before applying JNL and one of SI from secondary volume to primary volume due to be difference of amount between CDP and SI The copy amount of differential copy is small near current time and is large far from current time. In CDP case, the amount of differential copy is small when CDP's baseline volume is located near from current like before 12 hours. In SI case, the amount of it is large when the elapsed time of creation of SI's secondary volume is past from CDP baseline. In this situation, FIG. 18 shows an example of selection of recovery method.

Step 291: Recovery Manager checks whether Recovery time is within CDP JNL term or not. If it is Yes, the procedure goes to Step 292. If it is No, the procedure goes to Step 294.

Step 292: Recovery Manager checks whether elapsed time of SI/QS's PIT is without CDP JNL term or not. If it is yes, the procedure goes Step 293, If it is no, the procedure goes to Step 294.

Step 293: Recovery manager chooses CDP as recovery and terminate their process.

Step 294: Recovery manager chooses PIT's restore with DB's Log as recovery and terminate their process.

Based on this process, we can say following. In case that recovery time is within CDP JNL's term and elapsed time for SI's or QS's PIT is within CDP, recovery manager chooses recovery of SI, or QS's PIT with DB's log because the amount of differential copy on SI or QS's PIT with DB's log recovery is smaller than one on CDP recovery. In case that recovery time is within CDP JNL's term and elapsed time for SI or QS is without CDP, recovery manager chooses CDP recovery because the amount of differential copy is smaller than SI/QS's one. In case that recovery time is without CDP JNL's term and elapsed time for SI or QS is within CDP, recovery manager chooses to recovery SI, or QS's PIT with DB's log. In case that recovery time is without CDP JNL's term and elapsed time for SI or QS is within CDP, recovery manager chooses SI, or QS's PIT with DB's log recovery; Therefore, recovery manager may have a capability to select recovery method based on recovery time and a relation between a position CDP baseline volume and one of SI/QS PIT. If recovery manager uses other PIT technology or tape instead of SI/QS, recovery manager needs consider amount of data copy to estimate faster recovery time based on copy and applying DB's log.

In case of nearest consistent point restore, recovery manager restores data which is near consistent point from user specified time; CDP restores data by latest marker. Recovery manager restores data to the latest consistent point like tape, PIT mirror, or snapshot. Also, volumes for a DB may be protected by several types of copy technology, including CDP with SI, QS, or using any other disk base backup method. In that case, we may choose a faster DB's recovery method as well, as in Step 185.

Those two options can work in Step 146.

3.3.2 Recovery Operation

Figure 11:
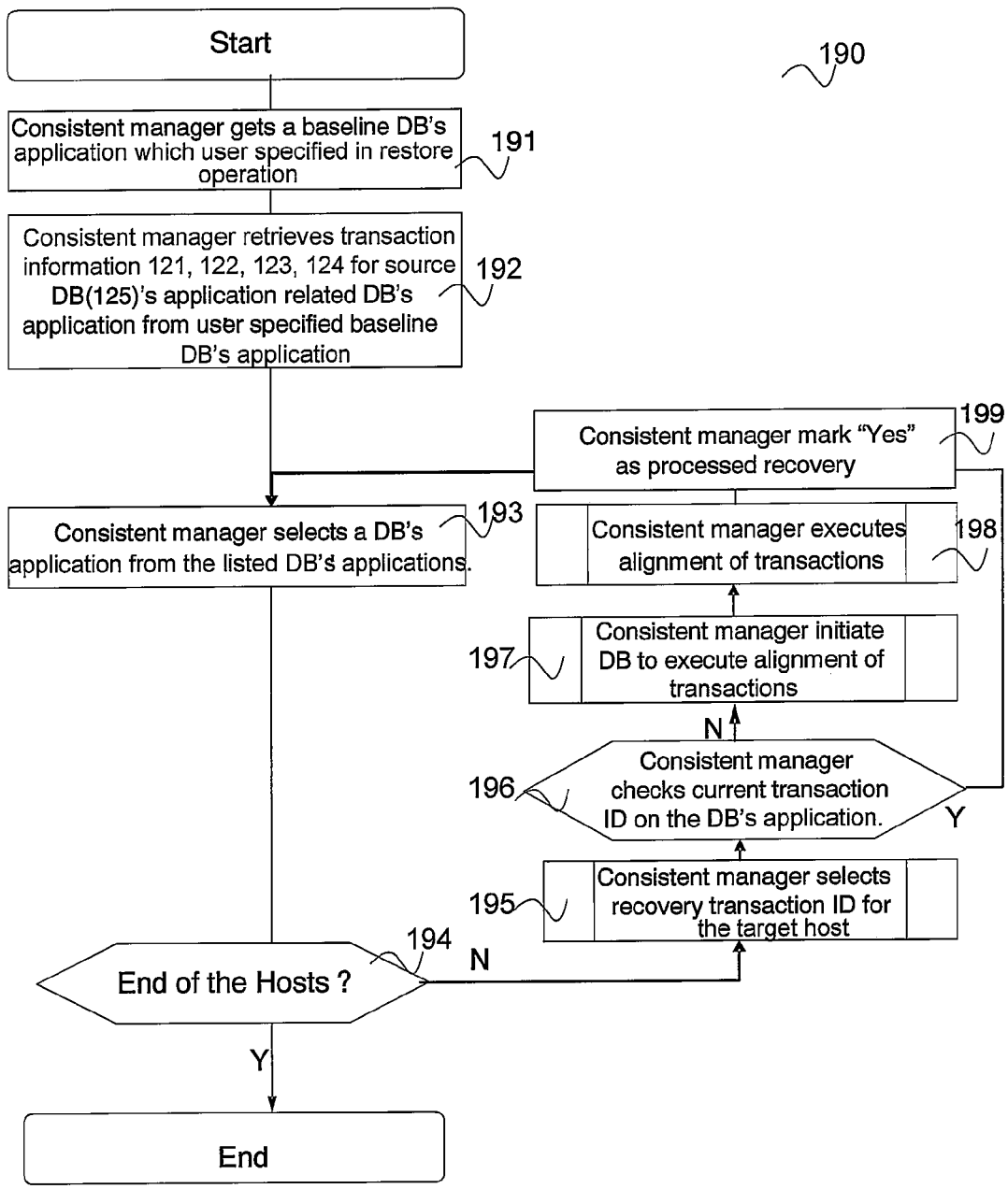
FIG. 11 illustrates an exemplary embodiment of a recovery operation.

After the DB mountable restore operation in Step 146, it is necessary to perform an alignment of multiple transactions in Step 147, as shown in FIG. 11. The procedure is following.

The procedure starts with step 191.

Step 191: Consistency Manager in recovery manager gets a baseline DB's application which user specified in restore operation.

Step 192: Consistency Manager retrieves transaction information 121, 122, 123, 124 for source DB (125)'s application related DB's application from user specified baseline DB's application.

Step 193: Consistency Manager selects a un-processed DB's application which is "No" indicated in 126 from the listed DB's applications.

Step 194: Consistency Manager checks if there is un-processed DB's application in the list; all of entries in the list 120 and 130 were processed. If there is (Y), it goes to Step 195. If there is no (N), it goes to end of procedure.

Step 195: Consistency Manager selects transaction ID on recovery for the target DB's application (Detail is discussed in Section 3.3.2.1).

Step 196: Consistency Manager checks current transaction ID on the DB's application. If the ID is the same as source DB's application recorded information (Y), the process goes to Step 199. If not, the Consistency Manager goes to Step 197. And we may use SCN instead of transaction ID when performing recovery for autonomy distributed database like Oracle.

Step 197: Consistency Manager initiates DB to execute alignment of transactions (Detail is discussed in Section 3.3.2.2).

Step 198: Consistency Manager executes same process for other data base to recover other database using this procedure as sub-routine after collecting related DB applications' information from aligned DB's application. When a Consistency Manager finish to recovery the selected database, consistency manager marks "Yes" in 126 to indicate finish of recovery for the selected database. End of the procedure.

3.3.2.1 Selecting a Recovery Transaction

Figure 12:
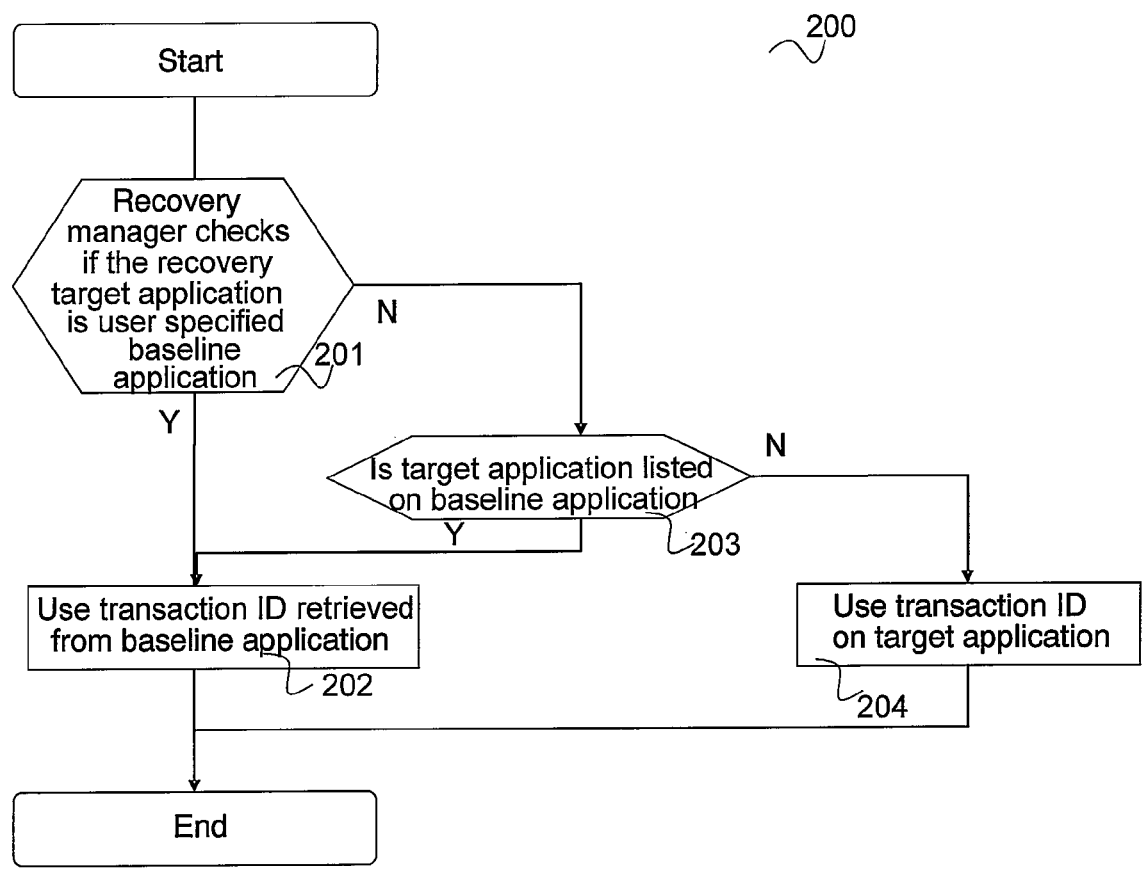
FIG. 12 illustrates an exemplary procedure for selecting a recovery transaction.

To select a recovery transaction ID, Consistency Manager retrieves transaction ID based on location of application. The procedure is illustrated in FIG. 12 and described in detail below.

Step 201: Consistency Manager checks if the recovery target DB's application is user specified baseline application or not. If it is, the procedure goes to Step 202. If it is not, the procedure goes to Step 203.

Step 202: Consistency Manager uses transaction ID for target DB's application retrieved from the baseline application's one.

Step 203: Consistency Manager checks if the target DB's application is listed on baseline DB's application's list. If it is, there is a relation between baseline DB's application and target DB's application, and the procedure proceeds to Step 202. If it is not, there is no such relation and the procedure proceeds to Step 204.

Step 204: Consistency Manager uses transaction ID for target application on target DB's application because Consistency Manager determines the target application to be independent from the baseline application.

Using this procedure, Consistency Manager uses transaction ID on baseline's application if there are linkages between baseline application and other application. If there is no, they uses own transaction ID for current target recovering application.

And we may use SCN instead of transaction ID when we recovery for autonomy distributed database like Oracle.

3.3.2.2 Executing Alignment of Transactions

To make an alignment of transactions, Consistency Manager executes rollback and roll forward operation on target DB's application if necessary for target DB.

The details of this procedure are described below and illustrated in FIG. 13.

Step 221: Consistency manager checks if current transaction ID on database table is below of a selected transaction in section 3.3.2.1. If it is, the procedure proceeds with Step 223. If it is not, the procedure goes to Step 222.

Step 222: Consistency manager executes roll forward operation up to next SCN for target DB.

Step 223: Consistency manager executes roll back operation based on selected transaction ID number.

Step 224: Consistency Manager checks the result. If there is any error for the rollback operation, Consistency Manager returns error (Step 225). If there is not, the procedure goes to end of procedure. Whereupon, the procedure terminates.

Figure 13:
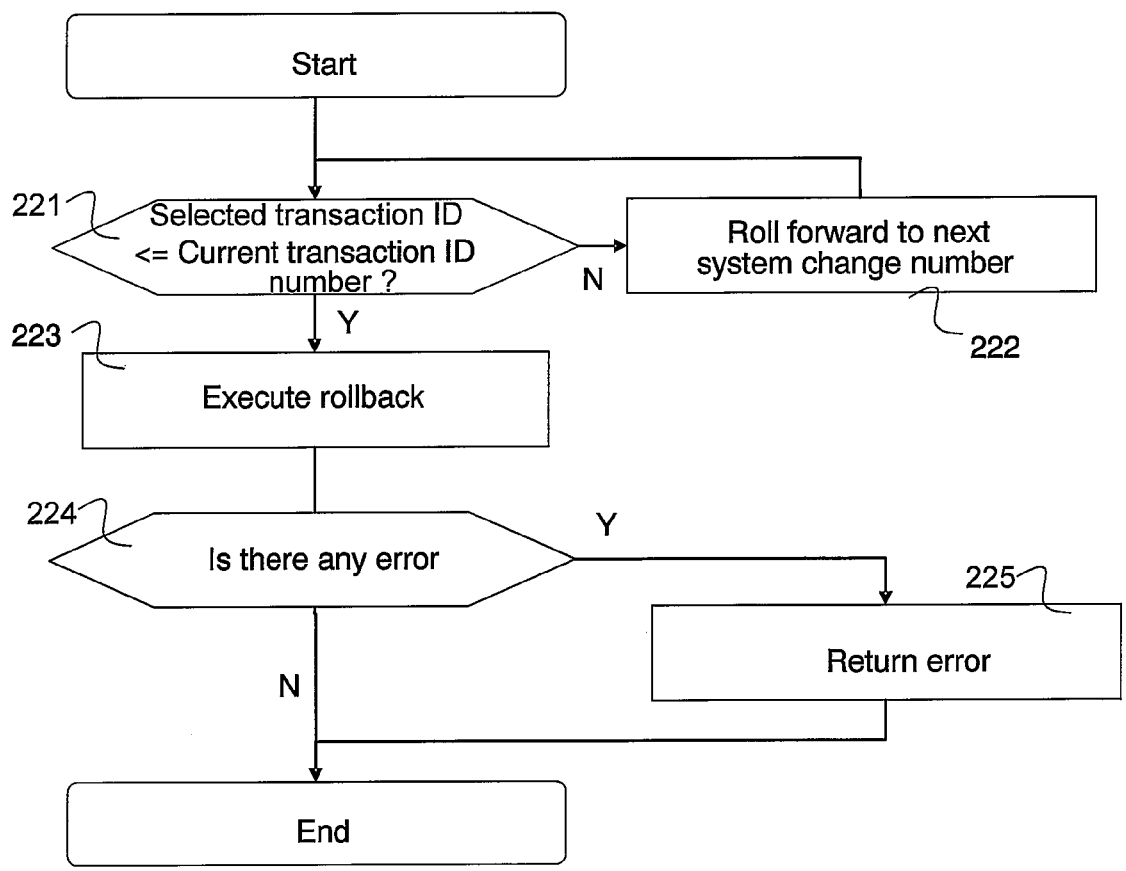
FIG. 13 illustrates an exemplary procedure for alignment of transactions.

In case of autonomy distributed database environment like oracle, we may use recovered baseline DB's SCN on each host's change number recovery instead of procedure FIG. 13 as alignment of transactions.

Figure 14:
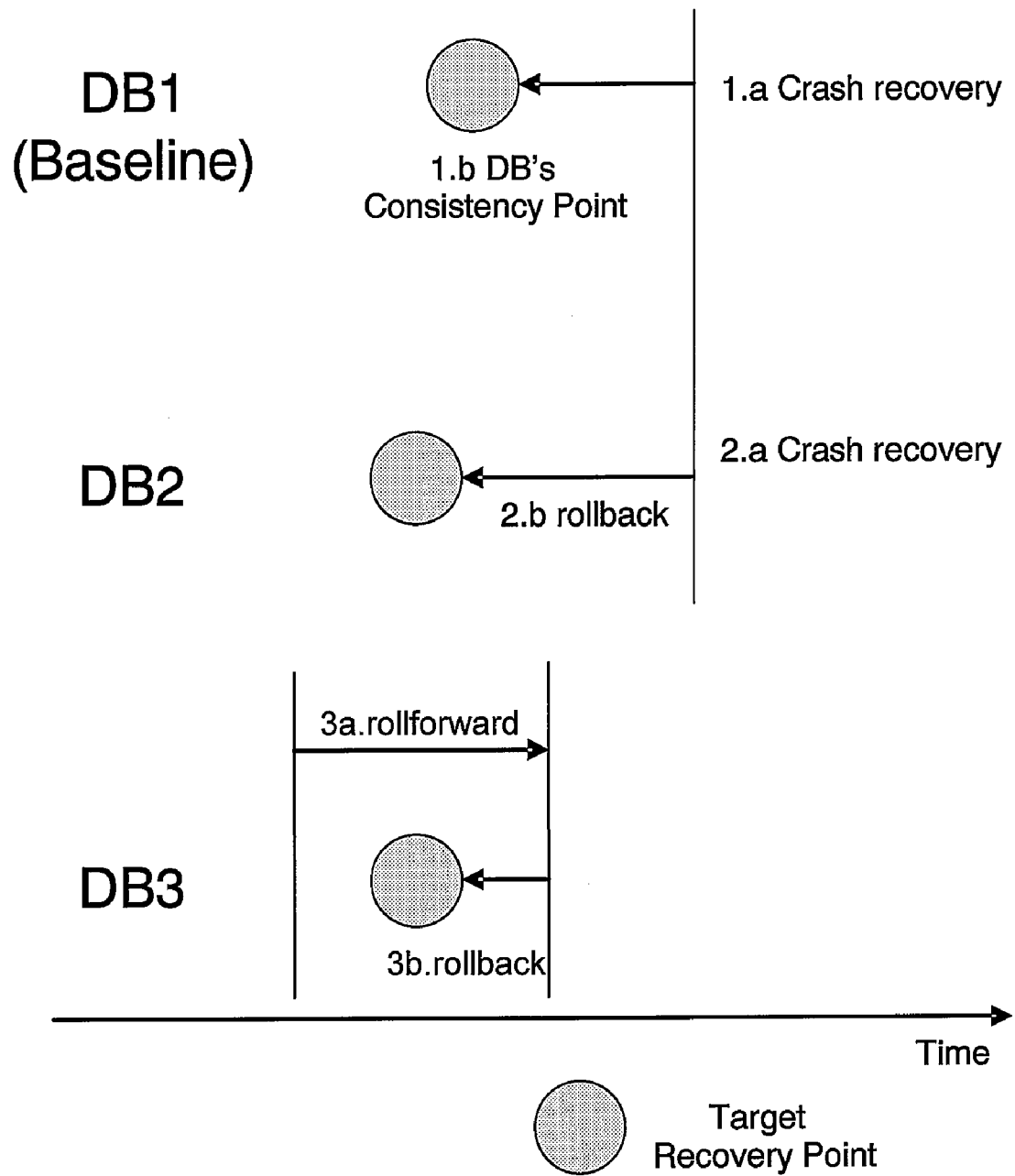
FIG. 14 illustrates an exemplary operating sequence of an embodiment of the inventive concept.

FIG. 14 illustrates an exemplary operation sequence of the described embodiment.

CDP protects DB1 and DB2 volumes under single consistency group. There is PIT image created by mirror technology for DB3. First, the user specified a recovery time, such as 8:30. Thereafter, the recovery manager restores DB1 and DB2's image using CDP. Recovery manager initiates crash recovery for DB1 and DB2 (1.*a* and 2.*a* in FIG. 14). The recovery manager restores DB3's PIT image using mirror or using a swap from primary volume to secondary volume and initiates an operation whereby DB performs roll forward up to user specified restore time (3.*a*).

It should be noted that storage and Host each have their own time clocks. Therefore, there may be differences in the recovered time.

After the crash recovery for CDP protected volumes, Consistency Manager in recovery manager executes an operation to make an alignment of transaction among DBs. DB1 is the baseline. Consistency Manager checks DB2's last transaction ID and DB2 is rollback to a specified transaction ID (2.*b*). Also, DB1 checks DB3's last transaction ID on DB1, if there is a communication capability. Consistency Manager initiates a procedure whereby DB3 executes roll forward (3.*a*) and rollback (3.*b*) using the procedure of FIG. 11.

In this embodiment, we assume the JNL manager is located on storage subsystem. Instead of storage subsystem, we may run JNL manager on switch based virtualization hardware like CISCO's MDS Series and EMC's invista, PC appliance based CDP protection hardware like Revivo's CPS series, software based CDP like CA's EnterpriseRewinder.

Embodiment 2

Recovery Under CDP's Several Consistency Group and Other Point in Time Backup Data This embodiment uses the system configuration having multiple JNL groups on storage subsystems configured to protect data.

Figure 16:
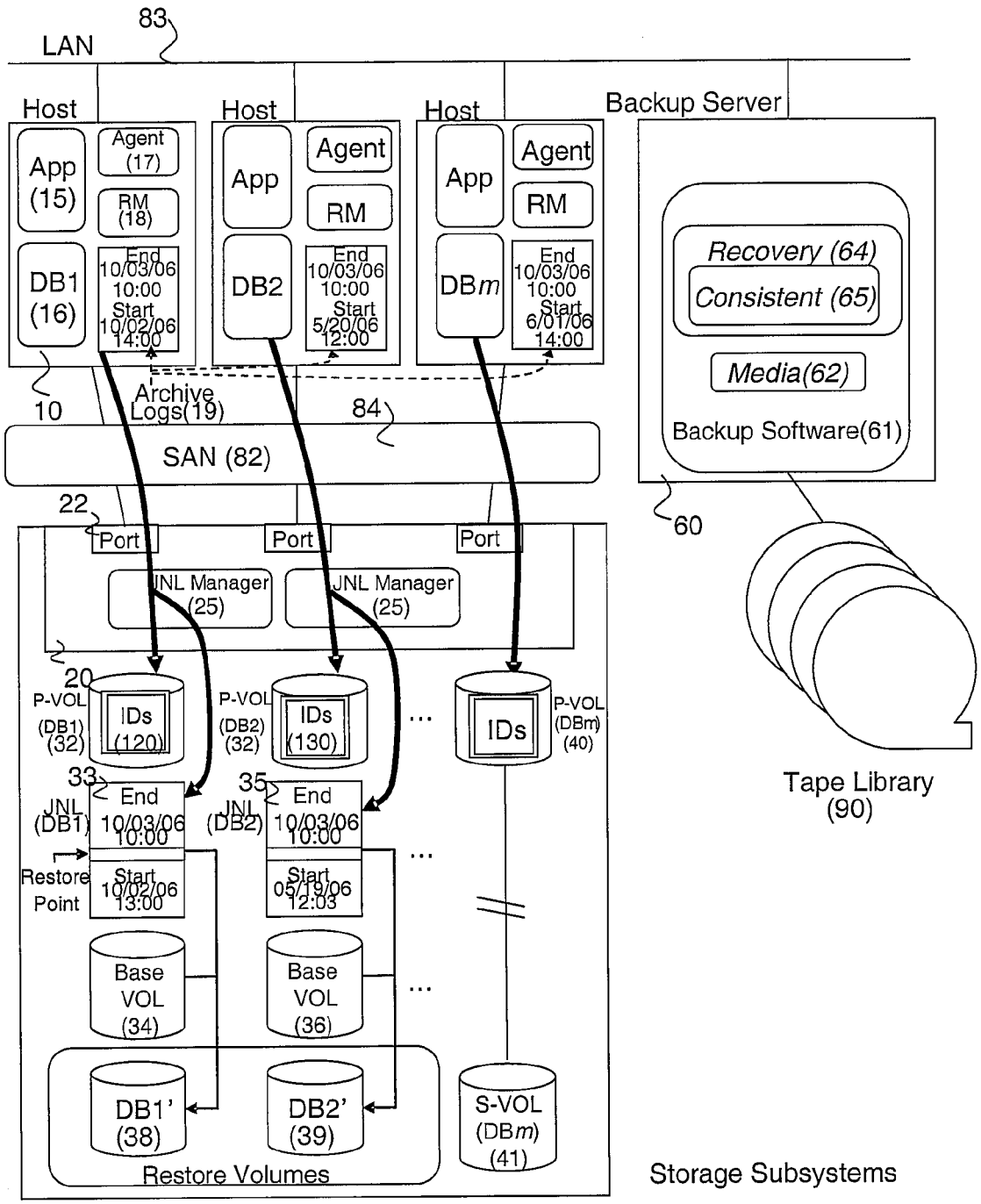
FIG. 16 illustrates a second exemplary embodiment of the inventive concept.

The physical system configuration of the second embodiment is similar to the one of the first embodiment. Logical configuration of the system of the second embodiment is similar to the logical configuration shown in FIG. 2. The difference is that each primary volumes is protected by a separate CDP journal manager, as shown in FIG. 16. Therefore, each CDP journal manager has own 10 serialization; each CDP journal manager serializes IOs for each volume on each JNL volume and it restore data from each serialized journal by specified point time or marker.

On restore and recovery, Recovery Manager restores and Consistency Manager recovers data by user specified time on baseline application's CDP protected volume under a consistency group. However regarding other volumes including other CDP's consistency groups, Consistency Manager uses last consistency point's backup data before the user specified time and executes roll forward up to the specified time using capability.

Figure 17:
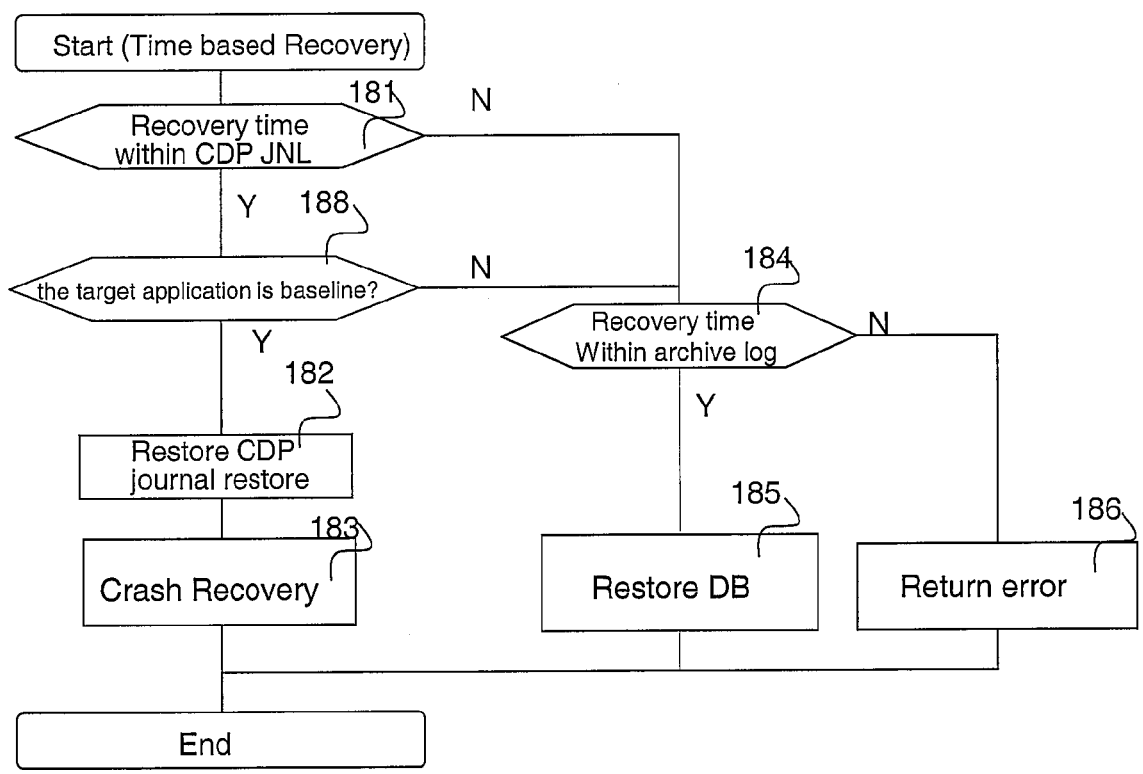
FIG. 17 illustrates an exemplary operating sequence of the second exemplary embodiment of the inventive concept.

Therefore time-based recovery operation in GUI has one step added, as shown in FIG. 17, to enable crash recovery for only baseline application's volumes.

Specifically, we have added a step for checking if the target application is baseline under CDP journal volume or not as Step 188. If it is, the procedure goes to Step 182. If it is not, goes to Step 184 to restore last consistent point's marker before user specified time.

Other operations performed by the system of the second exemplary embodiment of the inventive concept are the same as the corresponding procedures of the first embodiment.

Embodiment 3

Recovery Having Consistency Between DB and File Using Version Information for DB Aforesaid U.S. patent application Ser. No. 11/471,105 discloses a technique for achieving a consistency between DB and file. This technique is disclosed in the third embodiment described therein, the description of which is incorporated by reference herein in its entirety. Specifically, the version information for a file, which is related to a DB is stored in the DB. On the other hand, the exemplary embodiments of the present invention create a consistency among multiple DBs on recovery. However the key concept is the same as the aforesaid third embodiment described in U.S. patent application Ser. No. 11/471,105. Specifically, in the present invention, each DB stores transaction ID communicated with other DBs instead of storing the version information.

Moreover, other implementations of the invention will be apparent to those skilled in the art from consideration of the specification and practice of the invention disclosed herein. Various aspects and/or components of the described embodiments may be used singly or in any combination in the computerized storage system with data protection functionality. It is intended that the specification and examples be considered as exemplary only, with a true scope and spirit of the invention being indicated by the following claims.

What is claimed is:

1. A method for data recovery comprising:
    a. collecting consistency points from at least two database applications;
    b. collecting journal terms associated with continuous data protection for each of the at least two database applications;
    c. collecting log terms associated with each of the at least two database applications;
    d. displaying to a user a timeline for a protected term and consistency points for the at least two database applications;
    e. receiving recovery time selection from a user;
    f. receiving recovery database application selection from the user;
    g. receiving baseline database application selection from the user;
    h. performing crash recovery for each database application; and
    i. performing recovery of data based on transactions associated with the at least two database applications;
    j. selecting a recovery transaction identifier for the selected database application;
    k. checking a current transaction identifier for the selected database application;
    l. if the recovery transaction identifier is identical to the current transaction identifier, selecting another database application from the at least two database applications; and
    m. if the recovery transaction identifier is not identical to the current transaction identifier, executing alignment of transactions in the selected database application by executing a rollback and roll forward operation.

2. The data recovery method of claim 1, further comprising:
    n. obtaining the baseline database application;
    o. retrieving transaction information for a source database application associated with the baseline database application; and
    p. selecting an un-processed database application from the at least two databases applications.

3. The data recovery method of claim 1, further comprising providing a user with graphical user interface for making the selections.

4. The data recovery method of claim 1, wherein the consistency points comprise at least one of a point-in-time mirror copy, a snapshot point-in-time image, a tape and a continuous data protection marker.

5. The data recovery method of claim 1, wherein the consistency point comprises at least of hot backup data and cold backup data.

6. The data recovery method of claim 1, wherein collecting journal terms comprises accessing continuous data protection journal first and last header information via a remote access.

7. The data recovery method of claim 1, wherein the log comprises at least one of a redo log and an archive log.

8. A computerized data recovery system comprising a storage subsystem and a backup server operatively coupled to backup storage medium, the storage subsystem comprising a continuous data protection system and the backup server executing a recovery manager operable to:
    a. collect consistency points from at least two database applications executing on at least one host;
    b. collect journal terms of the continuous data protection system for each of the at least two database applications;
    c. collect log terms associated with each of the at least two database applications;
    d. display to a user a timeline for a protected term and consistency points for the at least two database applications;
    e. receive recovery time selection from a user;
    f. receive recovery database application selection from the user;
    g. receive baseline database application selection from the user;
    h. perform crash recovery for each database application; and
    i. perform recovery of data based on transactions associated with the at least two database applications;
    j. select a recovery transaction identifier for each database application from the at least two database applications;
    k. check a current transaction identifier for each database application;
    l. if the recovery transaction identifier is not identical to the current transaction identifier, select another database application from the at least two database applications; and
    m. execute alignment of transactions in the at least two database applications by executing a rollback and roll forward operation.

9. The computerized data recovery system of claim 8, wherein the recovery manager further comprises a consistency manager operable to:
    n. obtain the baseline database application; and
    o. retrieve transaction information for a source database application associated with the baseline database application.

10. The computerized data recovery system of claim 8, further comprising providing a user with graphical user interface for making the selections.

11. The computerized data recovery system of claim 8, wherein the consistency points comprise at least one of a point-in-time minor copy, a snapshot point-in-time image, a tape and a continuous data protection marker.

12. The computerized data recovery system of claim 8, wherein the consistency point comprises at least of hot backup data and cold backup data.

13. The computerized data recovery system of claim 8, wherein collecting journal terms comprises accessing continuous data protection journal first and last header information via a remote access.

14. The computerized data recovery system of claim 8, wherein the log comprises at least one of a redo log and an archive log.

15. The computerized data recovery system of claim 8, wherein the continuous data protection system comprises a journal manager operable to journal at least one of input and output operations for at least one of the database applications.

16. The computerized data recovery system of claim 15, wherein the continuous data protection system further comprises a second journal manager operable to journal at least one of input and output operations for at least one of the database applications.

17. A computer-readable medium embodying a set of computer instructions, the instructions, when executed by one or more processors causing the one or more processors to:
  a. collect consistency points from at least two database applications;
  b. collect journal terms associated with continuous data protection for each of the at least two database applications;
  c. collect log terms associated with each of the at least two database applications;
  d. display to a user a timeline for a protected term and consistency points for the at least two database applications;
  e. receive recovery time selection from a user;
  f. receive recovery database application selection from the user;
  g. receive baseline database application selection from the user;
  h. perform crash recovery for each database application; and
  i. perform recovery of data based on transactions associated with the at least two database applications;
  j. select a recovery transaction identifier for each database application from the at least two database applications;
  k. check a current transaction identifier for each database application;
  l. if the recovery transaction identifier is not identical to the current transaction identifier, select another database application from the at least two database applications; and
  m. execute alignment of transactions in the at least two database applications by executing a rollback and roll forward operation.

18. The computer-readable medium of claim 17, wherein the instruction further cause the one or more processors to:
  n. obtain the baseline database application; and
  o. retrieve transaction information for a source database application associated with the baseline database application.

19. The computer-readable medium of claim 17, further comprising providing a user with graphical user interface for making the selections.

20. The computer-readable medium of claim 17, wherein the consistency points comprise at least one of a point-in-time mirror copy, a snapshot point-in-time image, a tape and a continuous data protection marker.

21. The computer-readable medium of claim 17, wherein the consistency point comprises at least of hot backup data and cold backup data.

22. The computer-readable medium of claim 17, wherein collecting journal terms comprises accessing continuous data protection journal first and last header information via a remote access.

23. The computer-readable medium of claim 17, wherein the log comprises at least one of a redo log and an archive log.

\* \* \* \* \*

UNITED STATES PATENT AND TRADEMARK OFFICE
CERTIFICATE OF CORRECTION

| | |
|---|---|
| PATENT NO. | : 7,711,712 B2 |
| APPLICATION NO. | : 11/685138 |
| DATED | : May 4, 2010 |
| INVENTOR(S) | : Yoshiki Kano |

It is certified that error appears in the above-identified patent and that said Letters Patent is hereby corrected as shown below:

Column 1, line 29, "1200i," should be "1200i."

Column 9, line 45, was: "and SI the" should be: "and SI. The"

Column 12, line 34, was: "has own 10" should be: "has own IO"

Column 14, line 29, "and" should be deleted

Column 14, line 56, was: "minor copy" should be: "mirror copy"

Column 15, line 29, "and" should be deleted

Signed and Sealed this

Thirty-first Day of August, 2010

David J. Kappos
*Director of the United States Patent and Trademark Office*